G. H. BENJAMIN.
APPARATUS FOR CONDITIONING AND DEHYDRATING FIBROUS AND OTHER BODIES.
APPLICATION FILED AUG. 1, 1914.
1,225,211.
Patented May 8, 1917.
6 SHEETS—SHEET 1.
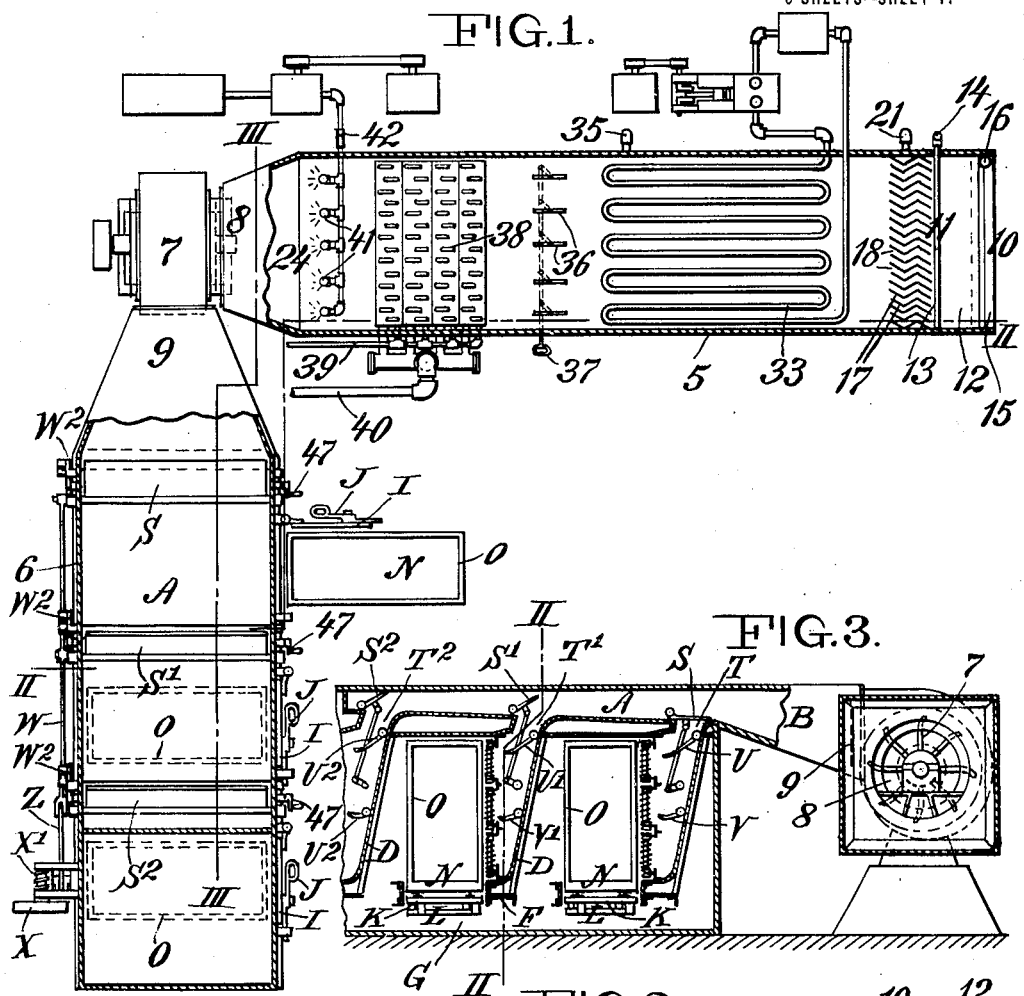
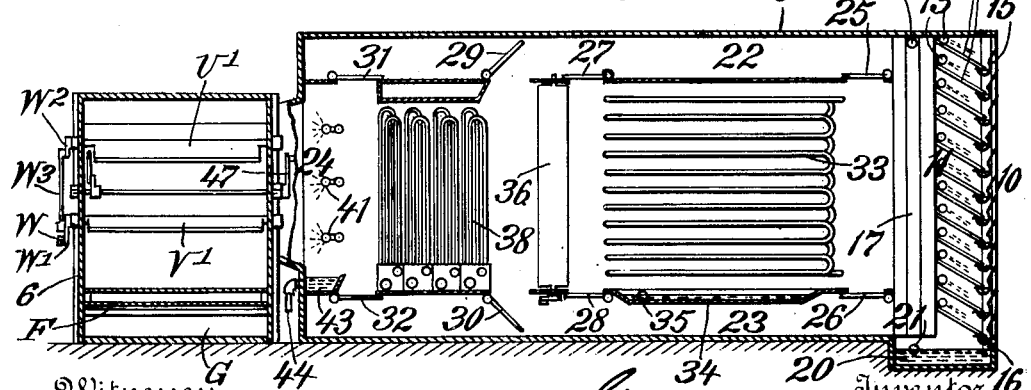
Witnesses:
Helen E. Koelsch.
Donn Twitchell
Inventor
George Hillard Benjamin G. H. BENJAMIN.
APPARATUS FOR CONDITIONING AND DEHYDRATING FIBROUS AND OTHER BODIES.
APPLICATION FILED AUG. 1, 1914.
1,225,211.
Patented May 8, 1917.
6 SHEETS—SHEET 2.
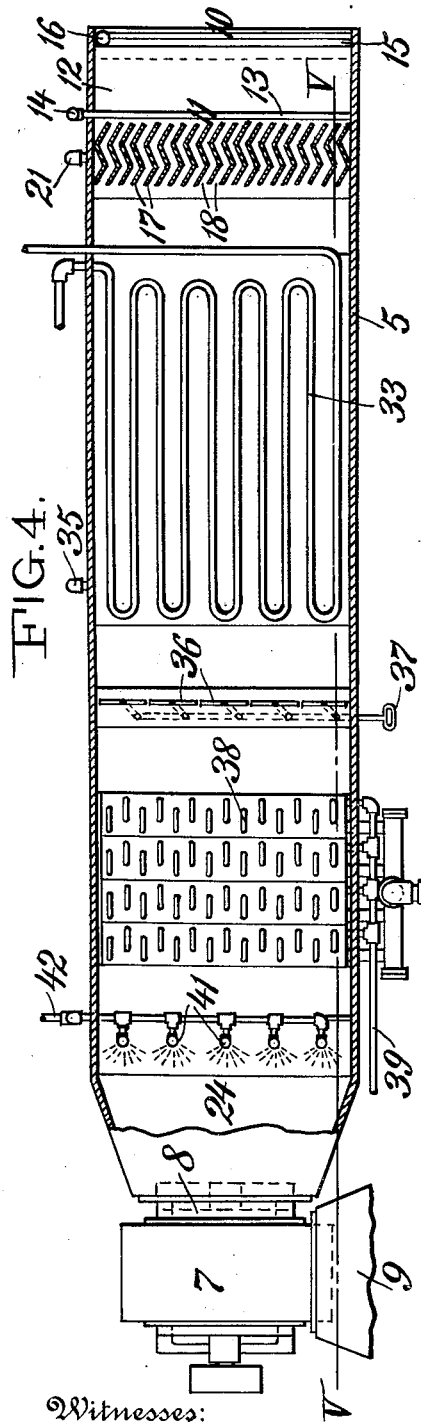
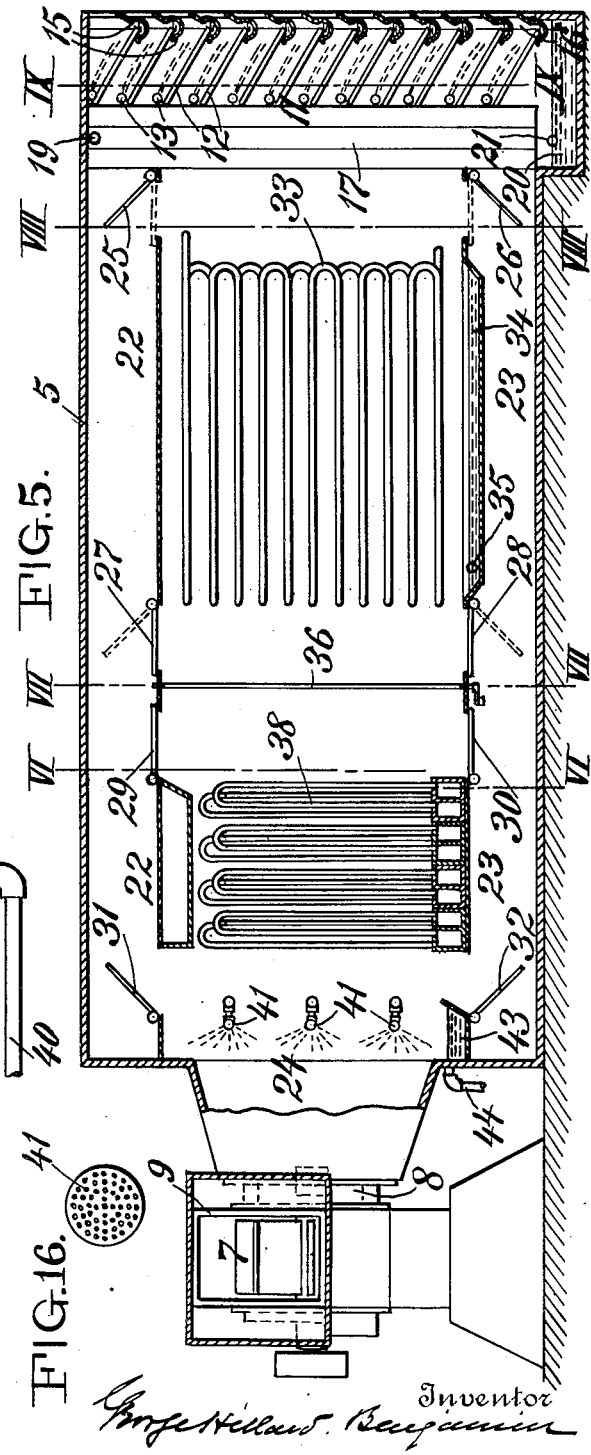

G. H. BENJAMIN.
APPARATUS FOR CONDITIONING AND DEHYDRATING FIBROUS AND OTHER BODIES.
APPLICATION FILED AUG. 1, 1914.
1,225,211.
Patented May 8, 1917.
6 SHEETS—SHEET 3.
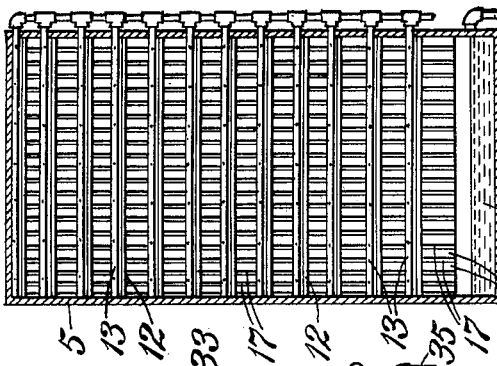
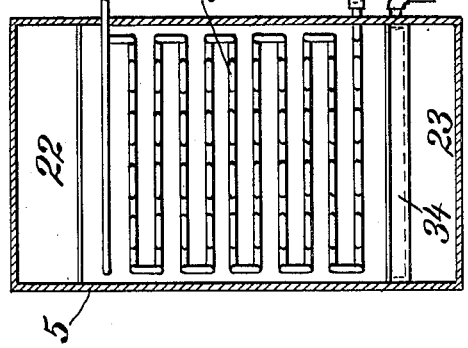
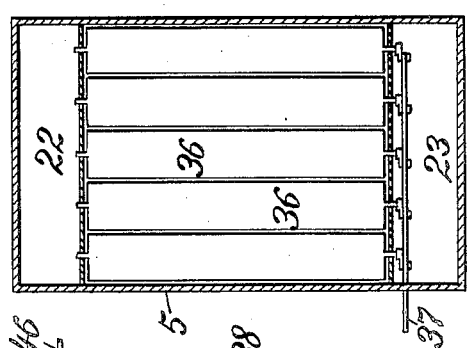
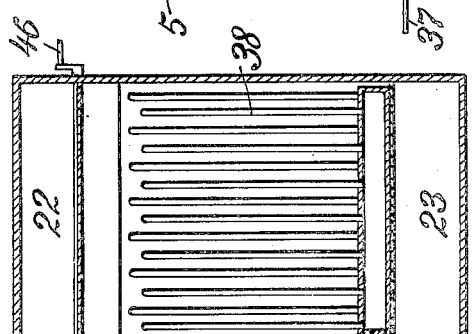
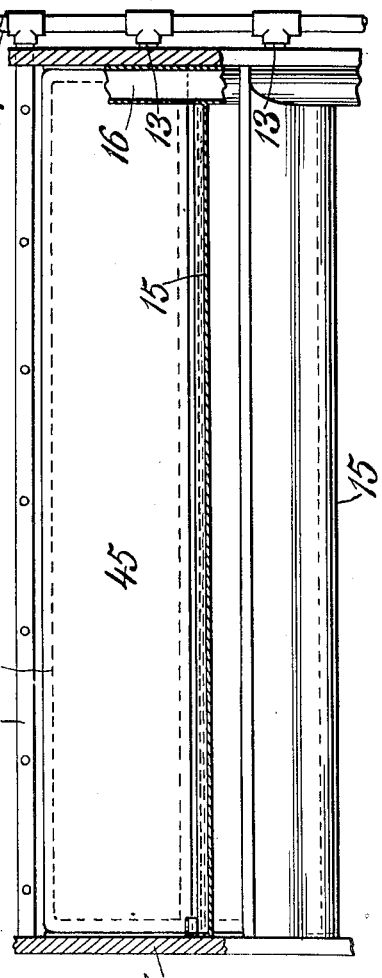
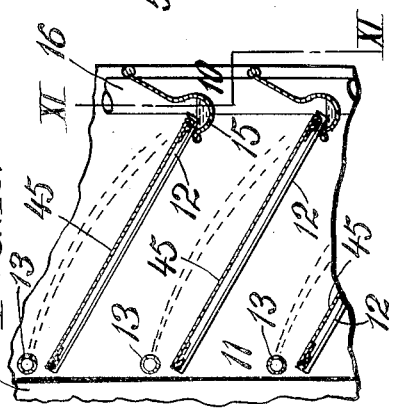

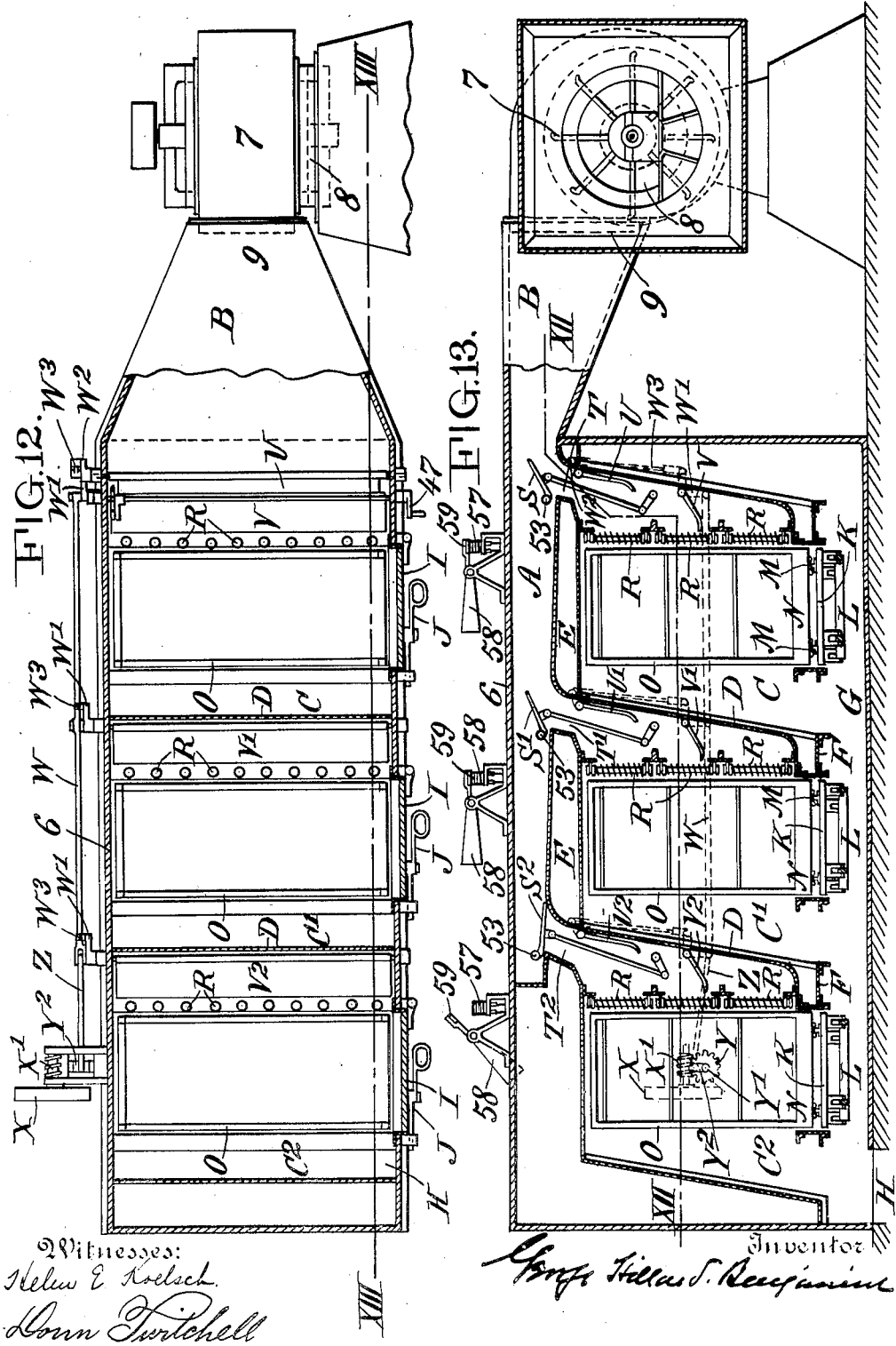

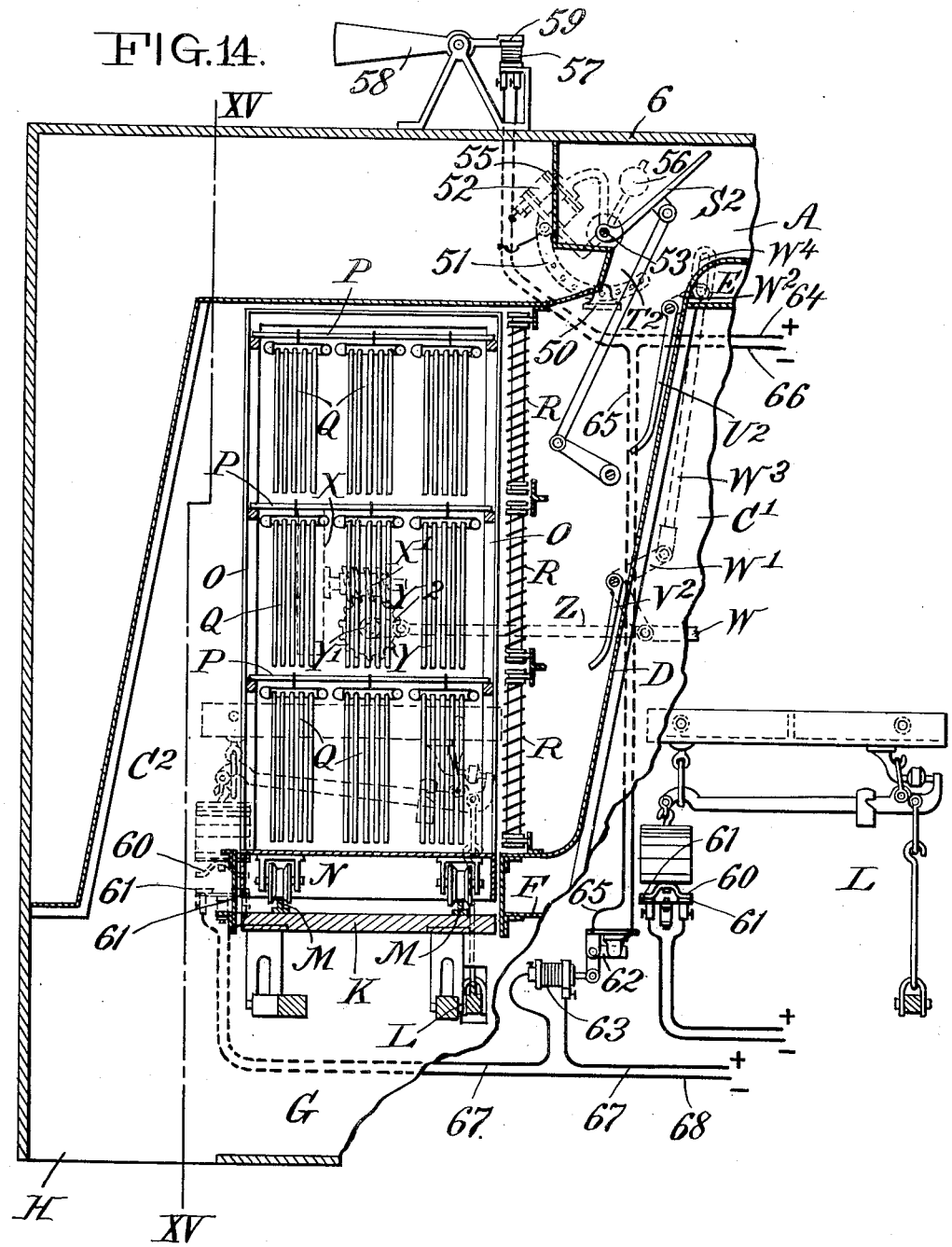

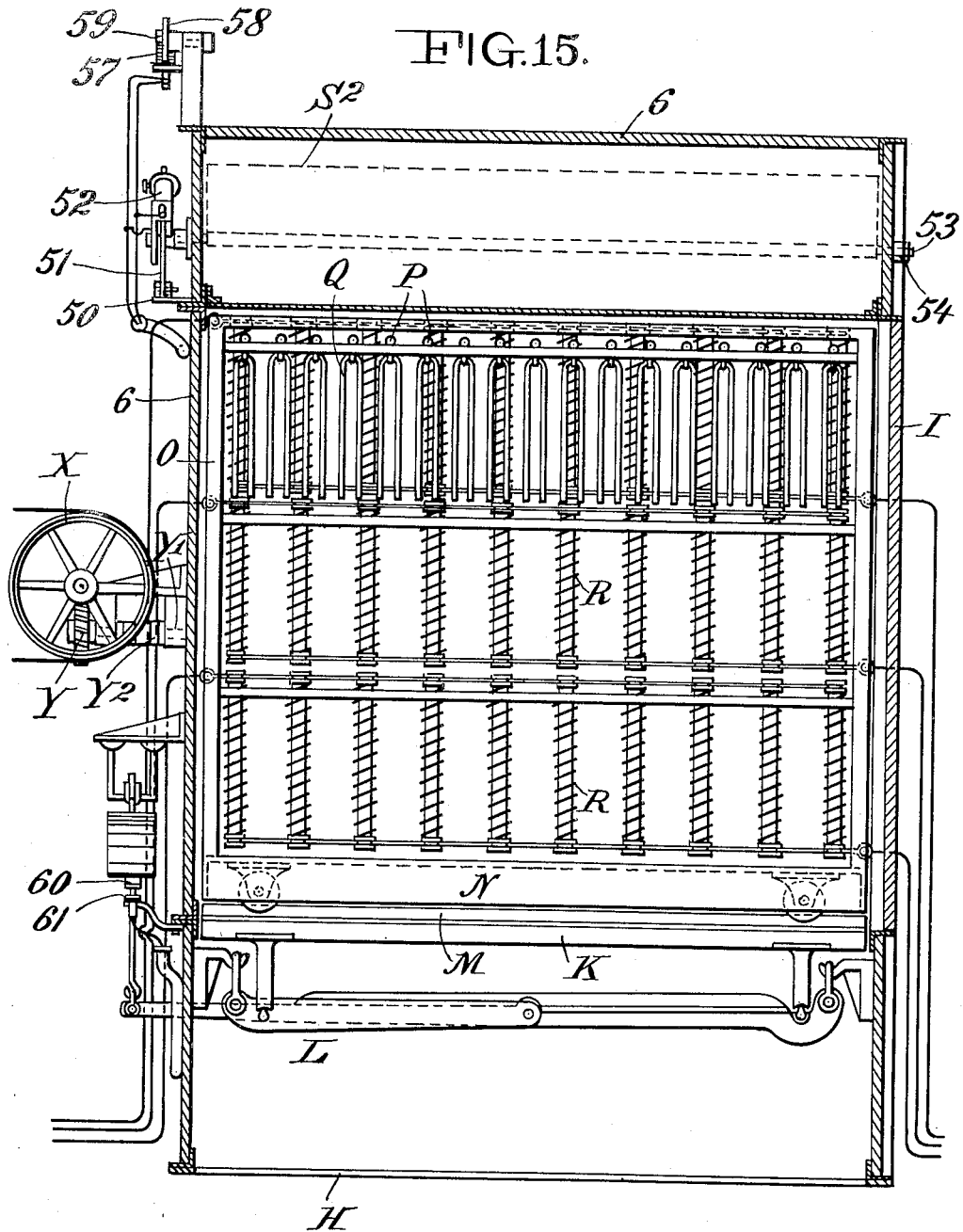

UNITED STATES PATENT OFFICE.

GEORGE HILLARD BENJAMIN, OF NEW YORK, N. Y.

APPARATUS FOR CONDITIONING AND DEHYDRATING FIBROUS AND OTHER BODIES.

1,225,211.   Specification of Letters Patent.   Patented May 8, 1917.

Application filed August 1, 1914. Serial No. 854,598.

*To all whom it may concern:*

Be it known that I, GEORGE HILLARD BENJAMIN, a citizen of the United States, residing at New York, in the county and State of New York, have invented certain new and useful Improvements in an Apparatus for Conditioning and Dehydrating Fibrous and other Bodies, of which the following is a specification.

My invention relates to a method and apparatus for conditioning and dehydrating fibrous and other bodies, and as disclosed in this application, is especially applicable to the conditioning and dehydrating of wool. The term conditioning, as applied to the treatment of wool, is understood to mean the treatment given to wool whether in the raw state, washed, bleached or spun, whereby the wool, after treatment, will contain all or nearly all the original oils or fats as in the form in which it was subjected to treatment, as also a definite amount of water. It will be understood by those skilled in the art to which this invention belongs, that wool in the different states above specified, contains different amounts of oils and fats; thus raw wool contains the most; washed, bleached and spun wool, the least. The amount of water, however, varies in accordance with the handling to which the wool has been subjected, mechanical extraction of the water, and the like.

In the practice which has heretofore obtained in conditioning and dehydrating wool, high temperatures (often 250° Fahrenheit) have been used, with the result that the oils and fats have been, to a certain extent, volatilized or oxidized, thus making the treatment uncertain and decreasing the value of the wool, it being well understood that the wool must contain certain amounts of oils and fats in order to have the required flexibility to insure good spinning and wear.

The object of my invention, therefore, as applied to wool, is to so treat the wool, that there will be no volatilization of the oils and fats either during conditioning or dehydration.

The accompanying drawings illustrate an apparatus especially adapted to carry into effect my improved method of conditioning and dehydrating wool, although such apparatus may be used for various other purposes, as for instance the preliminary treatment and subsequent dehydration of all classes, fruits, vegetables, rubber and other bodies containing or not containing oils, resins, or other bodies which are volatilizable at comparatively low temperatures, and from which it is desired to extract all or a portion of the moisture to bring them to a condition for storage or use.

In the accompanying drawings, similar letters and numerals indicate like parts. Figure 1 represents a general horizontal section of the apparatus as a whole. Fig. 2 is a vertical section taken along the line II—II of Fig. 1 and also on the line II—II of Fig. 3. Fig. 3 is a vertical section taken along the line III—III of Fig. 1. Fig. 4 is an enlarged view of that portion of Fig. 1 arranged transversely of Sheet 1. Fig. 5 is a vertical section on the line V—V of Fig. 4. Fig. 6 is a transverse section on the line VI—VI of Fig. 5. Fig. 7 is a tranverse section on the line VII—VII of Fig. 5. Fig. 8 is a transverse section on the line VIII—VIII of Fig. 5. Fig. 9 is a transverse section on the line IX—IX of Fig. 5. Fig. 10 is an enlarged view of the right hand end of Fig. 5. Fig. 11 is a section taken on the line XI—XI of Fig. 10. Fig. 12 is a horizontal section of that portion of Fig. 1 arranged longitudinally of Sheet 1, the section being taken on the line XII—XII of Fig. 13. Fig. 13 is a vertical section taken on the line XIII—XIII of Fig. 12. Fig. 14 is a vertical section showing an enlarged view of one of the treating cells and also illustrating in elevation, the details of the weighing mechanism. Fig. 15 is a vertical section taken on the line XV—XV of Fig. 14 and showing in elevation, the supplemental heating coils, the damper regulating mechanism, and the weighing mechanism, *i. e.*, that shown at the right hand side of Fig. 14. Fig. 16 is a front view of a spraying device of the disk type.

Referring first to Fig. 1. 5—6 represent a suitable casing. The part 5 is shown as arranged transversely of the sheet, and the part 6 longitudinally of the sheet, or stated in other terms, the parts 5 and 6 are disposed at right angles to each other. This, however, is not essential; they may be arranged in line or otherwise. Located between the parts 5 and 6, is a suitable blower 7, the induction orifice 8 of which is connected to the casing 5, and the eduction orifice 9 to the casing 6. The blower, therefore, draws through the casing 5 and delivers through the casing 6. Situated at the right hand end or opening 10 of the casing 5, is an air filter 11. The air filter consists of a series of superposed inclined plates 12. At the upper end of the plates are a series of pipes 13 connected to a suitable source of salt or fresh water supply 14. The lower ends of the plates 12 overlie troughs 15, suitably connected to a drainage tube 16. The surfaces of the plates 12 are covered with felt 45 which may be moistened by salt or fresh water from the pipes 13. Located back of the plates 12 and arranged vertically, are a series of shaped plates 17 so disposed as to form tortuous air channels 18 between the plates. These plates are preferably formed of metal, glass or other suitable material which may be readily cleaned, and may be covered with felt or other material and connected to a source of salt or fresh water supply 19, through which they may be kept wet. Situated under the plates 17 in the casing, is a water receptacle 20, in which the water which is discharged from the plates may be received, and which may be carried away through a suitable pipe 21.

The object of the air filter 11 is two-fold; first, to filter the air from particles of dirt, etc., and second, to chill the incoming air by surface contact with a cool body of salt or fresh water, the cooling effect being due not only to the chill of the water, but to the evaporation of the water from the plate surfaces, and the absorptive effect of the salt water, with the consequent decrease of the moisture in the incoming air.

Situated in the top and bottom of the casing 5 (see Fig. 5) are air channels 22—23. These air channels are brought together through an air channel 24, connected to the induction orifice 8 of the blower 7. Located in the air channels 22—23 are dampers 25—26, 27—28, 29—30 and 31—32. The operation of these dampers will be described later on. Situated in the casing 5 is a cooling apparatus 33—preferably a coiled pipe suitably connected to an ice machine.

I wish it understood that while I have shown the employment of an ice machine which may be conveniently used where the air temperature is such that the chill imparted to the air in passing over the cooling coils will carry the air to the dew point, I prefer to use in other localities, where the temperature conditions are different, i. e., where the temperature of the incoming air is high, apparatus such as generally disclosed by the apparatus at 11, where the absorption of the moisture of the atmosphere by brine is continual and gradual, but where the air is not brought to the dew point.

Under the pipe 33 is a vessel 34, connected to a suitable waste pipe 35, adapted to receive any drip from the cooling apparatus. Arranged vertically in the casing 5 are a series of pivoted dampers 36, controlled by a handle 37 from the exterior of the machine. Situated in the casing 5 is a heating apparatus 38, fed through a suitable pipe 39, from a source of steam, and having a waste pipe 40. Located in the casing 5 is a water spraying apparatus 41, preferably of the disk type shown in Fig. 16, connected to a source of water supply through a pipe 42. Located under the spraying apparatus 41 is a vessel 43 connected to a suitable waste pipe 44.

I will now describe the operation of the dampers 25 to 32 inclusive and 36. It will be seen on reference to Fig. 5, that the dampers 27—28, 29—30 and 36 (Fig. 4) are closed, and the dampers 25—26 and 31—32 open. When the dampers are in such position, the air passing the filter is drawn directly into the induction orifice 8 of the blower 7 through the air channels 22—23 and 24. Assuming now the dampers to be in the position shown in dotted lines, (25—26 29—30 and 36 closed, and 27—28 and 31—32 open) the air will be passed through the air filter, then through the cooling apparatus 33, thence through channels 22—23 and 24 to the induction orifice 8 of blower 7.

Referring now to Fig. 2, and assuming the dampers 25—26, 27—28, 31—32 and 36 closed (36 in the position shown in Fig. 4) and 29—30 open, the air will pass through the air filter, then through channels 22—23 to heating apparatus 38 to channel 24 to induction orifice 8 of blower 7. Assuming now that dampers 25—26, 27—28, 29—30, 31—32 and 36 are open, the air will pass through the air filter, then through the cooling apparatus 33, heating apparatus 38 to induction orifice 8 of blower 7.

From the above it will be seen that the air may be drawn by the blower and introduced at atmospheric temperature, or drawn through the cooling apparatus and chilled below the atmospheric temperature; or drawn through the heating apparatus and heated above the atmospheric temperature, or drawn first through the cooling apparatus and then through the heating apparatus, whereby it is first cooled and then heated. The spraying apparatus 41 it will be observed, is in the path of the air current to the blowing apparatus, or in other words, is in the channel 24. The object of this apparatus is to humidify the air by causing air to pass through a water vapor. Thus the air may be first filtered, then cooled, then heated, then humidified. The dampers 25 to 32 inclusive may be operated by suitable handles 46 arranged on the exterior of the casing. It will be understood, without further description, that by manipulating the dampers 25 to 32 inclusive and 36, various combinations of air current may be obtained.

Referring now to Figs. 12 and 13. The casing 6 is provided with a feed air trunk A in its upper part, the right hand end of which is connected at B with the eduction orifice 9 of the blower 7. The interior of the casing is divided into a series of cells, C, $C^1$, $C^2$. The division is effected by means of inclined partitions D which extend downward from horizontal partitions E, which form the bottom wall of the feed air trunk A, to partitions F which form part of the upper wall of the waste air trunk G. H indicates an outlet from the waste air trunk, which may be connected to the atmosphere or to a chimney, or to an exhaust blower, as desired. The casing 6 is provided with a series of doors I in one side, which correspond to the position of the cells and have suitable fastening devices J. Located in the bottom of each cell is a platform K, suitably supported upon a scale apparatus L of known construction. It will be observed that the lever portion of the scale is situated within the cell walls, while the beam and weights are exterior to the casing. As the scale apparatus (considered as a scale apparatus) forms no part of my invention, no further description will be given. I wish it understood that any suitable scale apparatus may be employed, that shown being such as is commonly used, and intended merely for illustration.

Located upon the top of the platform K are parallel rails M, and situated over the rails are wheeled carriages N adapted to be moved into and out of the cells through the doors I. In Fig. 14 the carriages N are shown as consisting of a framework O, on which is mounted removable rods P, from which are suspended skeins of woolen thread Q. It will of course be obvious to those skilled in the art to which this invention belongs, that the particular construction of the carriage will vary in accordance with the use to which it is to be put. Thus the carriage may be arranged to carry a series of trays with perforated bottoms, or a series of supports for cops or bobbins, and the like. I have not illustrated these features as they are now well known and in common use in various forms of drying apparatus.

Situated within each of the cells and at one side of the position occupied by the carriages N, are electric heaters R, the object of which is to increase the heat of the air currents passing through the individual cells, when desired. By reason of the electric heaters, one or more cells may be operated by air at one temperature, while one or more cells may be simultaneously operated by air at an increased temperature, and both of such bodies of air originally transmitted through the blower 7. This is an advantage, as it permits different operations to be simultaneously carried on in the same apparatus. Located at the entrance of each cell, is a damper, indicated by the letters S, $S^1$, $S^2$. These dampers may be manipulated from the exterior of the machine by hand through suitable levers 47. The dampers S, $S^1$, $S^2$, control the passage of air from the feed air trunk A into the respective cells through the feed passages T, $T^1$, $T^2$. It will be seen on reference to Fig. 13 that the dampers S and $S^1$ are open, thereby permitting the air to pass from the feed air trunk A through the cells C and $C^1$ to the waste air trunk G, and out through the outlet H, while the damper $S^2$ is closed, thereby shutting off cell $C^2$.

Located in the passages T, $T^1$, $T^2$, are three pairs of dampers U—V, $U^1$—$V^1$, $U^2$—$V^2$. These dampers are connected together in pairs through levers, and both connected to a horizontal rod W, which is constantly reciprocated by motion through the driven wheel X, worm $X^1$, pinion Y, shaft $Y^1$, and crank $Y^2$, which is connected by a rod Z to the rod W. Through the reciprocating action of the rod W, the dampers U—V, $U^1$—$V^1$, $U^2$—$V^2$ are constantly changing their positions, for instance; when in the position shown in full lines in Fig. 3, that is, across the air passages T, $T^1$, $T^2$, the incoming air currents are diverted through the upper portion of the cells; when in the position shown in full lines in Fig. 13, the incoming air currents are transmitted through the middle portion of the cells; when in the position shown in Fig. 14, the incoming air currents are transmitted through the bottom of the cells. Other positions may be given to the dampers, or the dampers of individual cells may be arranged to be controlled independently, so that, for instance, while the air current is passing through the top of cell C, a different position of the dampers of $C^1$ may cause the air current to pass through the bottom of this cell, etc. Such arrangement of dampers is of advantage as it is found in practice that in treating bodies containing a large amount of moisture, it is necessary to vary the altitude of the movement of the air currents through the cells to compensate for variations of weight of air current through the absorption of moisture, etc. I will not, in this specification, enter into a detailed description of the operation of these dampers, as this damper arrangement forms no part of this invention, the same having been made the subject of a patent granted to William A. Wood on Feb. 22, 1916, and numbered 1,172,575.

As before stated, the rod W is mechanically moved and gives motion to the dampers U—V, U¹—V¹, U²—V². The movement of the pinion Y effects a longitudinal movement of the rod W which transmits its movement to the dampers U—V respectively, and bell cranks W¹—W², the one arm of the bell crank W¹ being connected to the bell crank W² by the rod W³. At the upper end of this rod there is a slot W⁴ which takes over a pin in the end of the bell crank W².

It will be observed that when the rod W is reciprocated, the damper U is moved up and down, and that the same is true of the damper V, but owing to the lever arrangement, the movement of the damper U is delayed after that of the damper V, the purpose of which arrangement is to cause the incoming air, when the dampers are in the position shown in Fig. 13, to pass through the upper and middle sections of the cell, and subsequently by the action of the damper U, to cut off the air from the middle portions of the cell and divert the air through the upper portion of the cell, to be followed by dropping movement of the dampers to the position shown in Fig. 14 when the air is passed through the lower portion of the cell or through all of the portions.

In other words, it will be seen from the construction described, that the dampers take three successive positions, i. e., the first position as shown in Fig. 3; the second position as shown in Fig. 13; the third position as shown in Fig. 14, and that these positions follow in successive order, the dampers being in constant motion, the purpose of which, as heretofore explained, is to divert the air currents through different portions of the cells at successive intervals. I have not shown the device for altering the position of the dampers from that shown in the drawings; manifestly, this can be easily done by shifting the dampers on their supporting shafts.

Referring now to Figs. 14 and 15. Adjustably mounted on a bracket 50 on the outside of the casing, is a sector 51, on the upper end of which is located a magnet 52. Mounted on a shaft 53 having bearings 54 in each side of the casing, is an armature 55, and mounted on the same shaft is the damper S². The armature and damper are rigidly connected to the shaft so that when motion is imparted to the armature, corresponding motion will be imparted to the damper and vice versa. Mounted also upon the shaft 53, is a counterweight 56. Mounted on top of the casing is a magnet 57 and a semaphore 58, one end of which, 59, overlies the magnet and acts as an armature. Situated under the weight attached to the scale beam, is a spring contact 60, adapted to coöperate with contact plates 61. (Two views are shown in Fig. 14.) 62 represents a knife switch controlled by the magnet 63. The circuit connections of the parts are as follows:

One terminal of the magnet 57 and magnet 52 is connected through a wire 64 leading to a source of electric energy. One terminal of magnet 57 and one terminal of magnet 52 are connected through a wire 65 leading to one terminal of knife switch 62. The opposite terminal of the knife switch 62 is connected through a wire 66 with the opposite terminal of the same source of energy that the wire 64 is connected with. One of the contact plates 61 and the magnet 63 are connected through wire 67 with one terminal of the source of electric energy; the other contact plate 61 is connected through wire 68 with the opposite terminal of the same source of energy with which the wire 67 is connected. Manifestly the source of energy of 64—66, 67 and 68 may be the same, provided polarity is observed.

The operation of this portion of the device is as follows: The carriage N containing the material Q is weighed, and the amount of moisture it is desired shall be removed, determined. The scale beam is then weighted to represent the weight of the amount of moisture to be removed. When the required moisture has been removed, the scale beam descends, contact spring 60 coacts with contact plates 61, deënergizes the magnet 63, opens the knife switch 62, releases armature 55, drops damper S² and drops semaphore 58. The dropping of the damper S² cuts off further entrance of air through the cell and the semaphore indicates the fact that the amount of moisture desired has been removed.

The electrical apparatus described is merely illustrative. I do not wish to limit myself in any wise to that disclosed. Any device which will indicate that the weight of the material contained in the carriage has changed by reason of the amount of moisture removed, and which will indicate such fact, will be within the contemplation of my invention. I wish to have it understood that the drawings as regards the mechanical and electrical features are in a sense diagrammatic, and merely intended to illustrate the general features of construction of the apparatus and to show means by reason of which my improved method may be carried into effect.

Having described the general features of construction of such an apparatus as may be used to carry my invention into effect, I will now describe the method of using the apparatus which I desire to employ.

Air at the temperature of the atmosphere is drawn into the apparatus through the action of the blower 7. In passing through the casing 5, the air is treated in accordance with the use to which it is to be put; thus, the air may be washed; it may be cooled to remove a portion of its moisture; it may be heated to expand it, or it may be passed through a body of sprayed water to increase its moisture, or it may be acted on in different stages to for instance, first wash, then chill, then heat before delivery to the casing 6. In the conditioning of wool it is advantageous to first wash the air, then separate as much moisture as possible, then heat to a temperature not exceeding 160° Fahrenheit. In practice I prefer to first heat the wool in the casing 6, by first heating the incoming air without separating its moisture, and then passing the heated air over the wool. In some cases, I prefer to first heat the air and then introduce moisture before passing the air over the wool, the object of which step is to heat the wool to a temperature of approximately 160°, and without producing any exosmotic effect from within the cells of the wool. After the wool has been heated say to 160°, the incoming air is first washed, then dehydrated of a portion of its moisture, then heated to 160° temperature, the object of which step is to bring about endosmotic action and absorb the moisture from the wool and without producing any volatilization of the oils or fats.

After the treated air has reached the blower, it is passed through the cells C, C¹, C², containing the wool to be conditioned. In practice it has been found that air currents (like all moving bodies) will follow the path of least resistance, and it may be that such path of least resistance would be through the top, middle or bottom of the cells, or some intermediate portion, with the result that the wool in the cells would be unequally treated. To avoid this, the dampers U—V, U¹—V¹, U²—V² are provided, which, by being properly actuated, change the path of movement of the incoming air currents, as for instance, from the top to the middle, or to the bottom, alternately varying the path of the air currents through the cells. This arrangement of dampers, for changing the direction of the air currents, has proved to be of the greatest practical importance in effecting efficient drying of all of the materials contained within the cells.

Assuming now that the wool contains 20% of moisture, which it is desired to remove, the scale beam is set to make contact with the electrical devices when such 20% of moisture has been eliminated, and give visible indication of such fact, and to automatically shut off the cell when the proper degree of moisture has been eliminated. Manifestly the same arrangement may be used where it is desired to increase the moisture, or increase the moisture with the addition of oil carried in through vaporized moisture. In the treatment of certain grades of wool it is advantageous to raise the temperature above 160° for short periods, and this can be done through the electric heaters disposed in each cell.

I wish it understood that this specification is addressed to those skilled in the art of treating fibrous bodies for the purpose of removing moisture or other bodies, and to point out that the apparatus disclosed may be manipulated in a great many ways to produce results desirable in the treatment of such bodies and which it is unnecessary to describe, as they will be fully understood without such description.

I am aware that it has heretofore been suggested to subject bodies to the action of heated dehydrated air currents for the purpose of drying such bodies and extracting all of the contained moisture, and such I do not claim as my invention,—my invention being limited to a process or method of operation; wherein the body is subjected to the action of heated dehydrated air currents for only sufficient length of time to remove only such a percentage of the originally contained moisture as will be exuded within the time by the temperature and absorbing effects of the air currents, whereby there will be left in the body under treatment, sufficient moisture to maintain the cell membranes of the body treated moist, or otherwise in a condition to subsequently permit, if desired, the endosmotic introduction of water, or otherwise, give to the body the required percentage of moisture.

I wish it understood that I understand a body from which all the water has been removed to be a desiccated body which is not capable of endosmotically absorbing water within the cell structure; whereas a dehydrated body is one which is capable of endosmotically absorbing water.

Having thus described my invention, what I claim is:

1. In an apparatus for conditioning wool, the combination of, means for filtering air, means for heating air, a series of dehydrating cells, means for conveying the modified air to and from the cells, means for changing at intervals the line of movement of the air current through the cells, and a supplemental air heating device in proximity to each cell.

2. In an apparatus for conditioning wool, the combination of, means for filtering air, means for heating air, a series of dehydrating cells, means for conveying the modified air to and from the cells, means for changing at intervals the line of movement of the air current through the cells, a supplemental air heating device in proximity to each cell, and means for controlling the heat developed by each supplemental air heating device.

3. In an apparatus for conditioning wool, the combination of means for primarily modifying the condition of the air to be introduced into the apparatus as regards temperature and humidity, a series of dehydrating cells, means for changing at intervals the line of movement of the introduced air currents through the cells, a weighing apparatus for each cell, and means structurally independent of the weighing apparatus but energized by the weighing apparatus for indicating the change of weight of the material acted upon contained within the cells.

4. In an apparatus of the class described, the combination of a blower, an air feed trunk, a waste air trunk, a series of cells interposed between the air feed trunk and the waste air trunk, air passages leading from the air feed trunk to the cells, air passages leading from the cells to the waste air trunk, means in said air passages leading from the air feed trunk to the cells for changing at intervals the line of movement of the air currents through the cells, and air heating devices in each of the cells located in the path of movement of the air currents through the cells.

5. In an apparatus of the class described, the combination of an air heater, a blower, an air feed trunk through which hot air may be transmitted, a waste air trunk, a series of cells interposed between the air trunks, air passages leading from the air feed trunk to the cells, air passages leading from the cells to the waste air trunk, means in each cell for adding heat to the air currents delivered to the cell, and means in relation to each cell for changing the level of the air currents passing through the cell at intervals.

6. In an apparatus of the class described, the combination of a blower, an air feed trunk, a waste air trunk, a series of cells interposed between the air trunks, a movable carriage situated in each cell, an air passage leading from the air feed trunk to the cell, an air passage leading from the cells to the waste air trunk, valves between the air feed trunk and the air passage leading from the air feed trunk to the cells, a plurality of dampers in each air passage leading from the air feed trunk to the cells, means for varying the position of the dampers at intervals, together with means for adding supplemental heat to the air delivered to the separate cells.

7. In an apparatus of the class described, the combination of a blower, an air feed trunk, a waste air trunk, a series of separate cells interposed between the two air passages, each cell having its floor arranged as a scale platform connected to a weigh-beam external to the scale, an air passage leading from the air feed trunk to the cell, an air passage leading from the cell to the air waste trunk, a carriage adapted to be moved into and out of the air cell, together with means for visibly indicating changes in weight of the carriage or material carried thereby.

In testimony whereof, I affix my signature, in the presence of two witnesses.

GEORGE HILLARD BENJAMIN.

Witnesses:
HELEN E. KOELSCH,
LESTER BEARDSLEY.